US009843731B2

(12) United States Patent
Shimosato

(10) Patent No.: US 9,843,731 B2
(45) Date of Patent: Dec. 12, 2017

(54) IMAGING APPARATUS AND METHOD FOR CAPTURING A GROUP OF IMAGES COMPOSED OF A PLURALITY OF IMAGES AND DISPLAYING THEM IN REVIEW DISPLAY FORM

(71) Applicant: CANON KABUSHIKI KAISHA, Tokyo (JP)

(72) Inventor: Jiro Shimosato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

(21) Appl. No.: 14/139,015

(22) Filed: Dec. 23, 2013

(65) Prior Publication Data
US 2014/0184848 A1  Jul. 3, 2014

(30) Foreign Application Priority Data
Dec. 27, 2012  (JP) ................. 2012-284430

(51) Int. Cl.
*H04N 5/232* (2006.01)
*H04N 1/00* (2006.01)

(52) U.S. Cl.
CPC ....... *H04N 5/23293* (2013.01); *H04N 1/0044* (2013.01); *H04N 5/23245* (2013.01); *H04N 5/232* (2013.01)

(58) Field of Classification Search
None
See application file for complete search history.

(56) References Cited

U.S. PATENT DOCUMENTS

| | | | | |
|---|---|---|---|---|
| 5,943,050 | A * | 8/1999 | Bullock et al. | ................ 715/783 |
| 6,515,704 | B1 * | 2/2003 | Sato | ................... H04N 1/00442 |
| | | | | 348/333.05 |
| 2008/0007631 | A1 * | 1/2008 | Abe | .......................... 348/231.3 |
| 2011/0102421 | A1 * | 5/2011 | Minamino et al. | ........... 345/419 |
| 2012/0008012 | A1 * | 1/2012 | Fujita | ........................ 348/231.2 |
| 2012/0249853 | A1 * | 10/2012 | Krolczyk et al. | ........ 348/333.01 |
| 2014/0043504 | A1 * | 2/2014 | Ito et al. | ....................... 348/239 |
| 2014/0184868 | A1 * | 7/2014 | Takahashi | ................ 348/333.01 |

FOREIGN PATENT DOCUMENTS

| | | | |
|---|---|---|---|
| JP | 2001-145002 | A | 5/2001 |
| JP | 2001-285689 | A | 10/2001 |
| JP | 2002-142148 | A | 5/2002 |
| JP | 2004-260751 | A | 9/2004 |
| JP | 2006-094284 | A | 4/2006 |
| JP | 2008-124826 | A | 5/2008 |
| JP | 2008103831 | A * | 5/2008 |
| JP | 2010-263270 | A | 11/2010 |
| JP | 2011160304 | A * | 8/2011 |
| JP | 2012-253449 | A | 12/2012 |

* cited by examiner

*Primary Examiner* — Justin P Misleh
(74) *Attorney, Agent, or Firm* — Canon U.S.A., Inc.

(57) ABSTRACT

An imaging apparatus capable of performing image display that allows a user to more effectively check images of a group composed of a plurality of images generated in response to a single shooting instruction, includes a control unit configured to perform control to cause an imaging unit to generate a plurality of images in response to a single shooting instruction, and a display control unit configured to, as automatically performed review display after shooting in response to the shooting instruction, perform control to sequentially display the plurality of generated images one by one on a display unit, and then display the plurality of images in a multi-display form on the same screen.

26 Claims, 11 Drawing Sheets

601

604

602

605

603

606

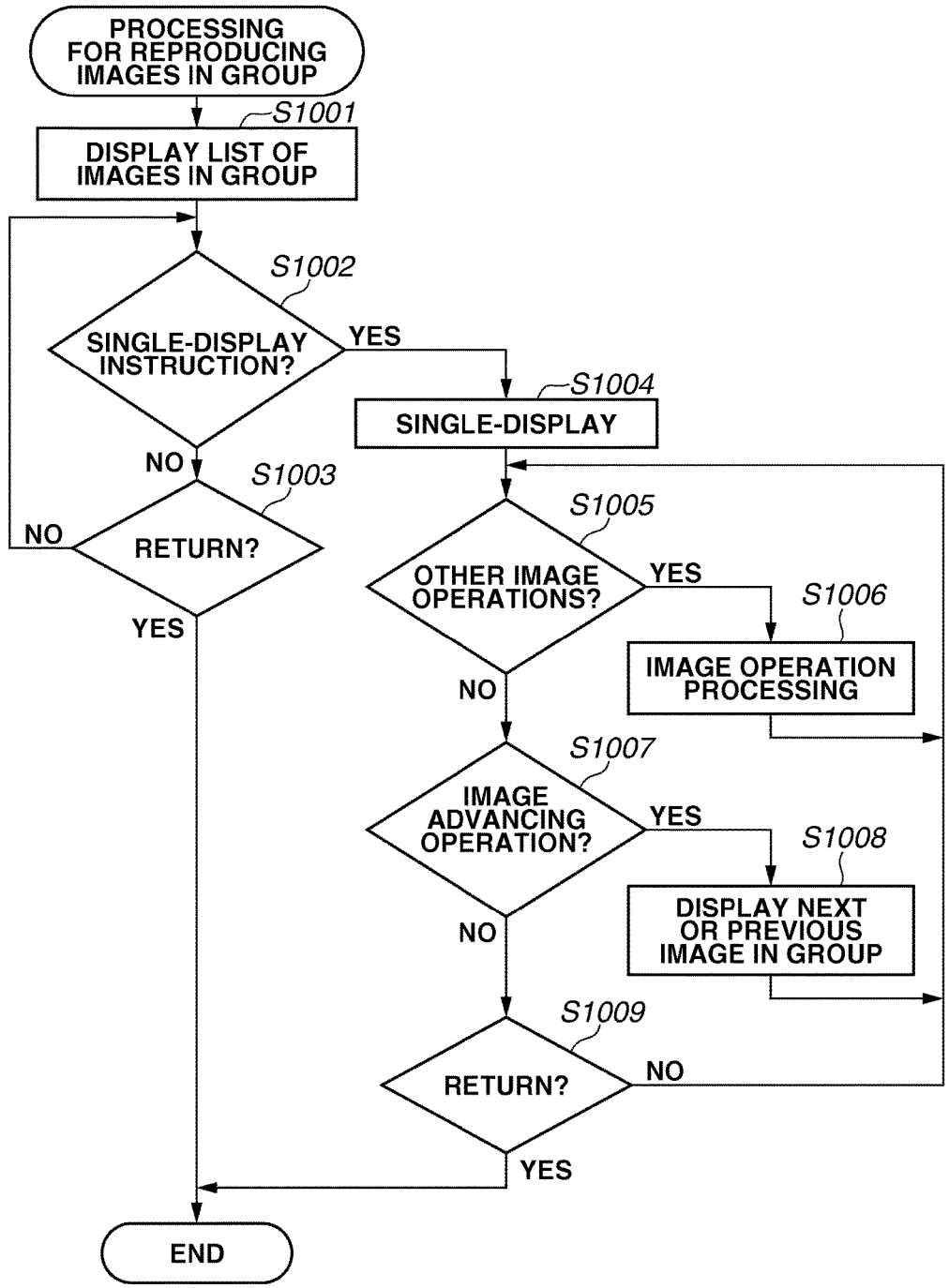

IMAGING APPARATUS AND METHOD FOR CAPTURING A GROUP OF IMAGES COMPOSED OF A PLURALITY OF IMAGES AND DISPLAYING THEM IN REVIEW DISPLAY FORM

BACKGROUND

Field

Aspects of the present invention generally relate to an imaging apparatus for capturing a group of images composed of a plurality of images and displaying them in review display form, and to a method for controlling the imaging apparatus.

Description of the Related Art

A certain type of imaging apparatus that can capture a plurality of images with a single shooting instruction in continuous shooting or bracket shooting, and then display the plurality of captured images in review display form, is known.

Japanese Patent Application Laid-Open No. 2001-145002 discusses a technique for displaying, after continuous shooting or automatic bracket shooting, images in a review display form in which two images (the first and the last images) out of a plurality of captured images are automatically displayed in succession. Japanese Patent Application Laid-Open No. 2001-145002 further discusses a technique for automatically displaying, after continuous shooting or automatic bracket shooting, a plurality of captured images in multi-display form, and then displaying them in a review display form in which any one image is enlarged and displayed full-screen.

Japanese Patent Application Laid-Open No. 2008-124826 discusses the following techniques for displaying a plurality of captured images in a review display form after continuous shooting or automatic bracket shooting.

Display the plurality of captured images with the through image side by side.

Display the plurality of captured images side by side for each setting value.

Display in a tiling way the plurality of captured images in respectively different display sizes at random positions.

Display the plurality of captured images in a stacked way while sequentially selecting at random the position, orientation, and display size of each image.

However, with the above-described techniques of review display discussed in Japanese Patent Application Laid-Open No. 2001-145002, only the first and the last images, or any one image out of the plurality of images captured in response to a single shooting instruction are largely displayed full-screen. With the technique of review display discussed in Japanese Patent Application Laid-Open No. 2008-124826, the plurality of images captured in response to a single shooting instruction is not largely displayed full-screen. Accordingly, with any of the above-described techniques of review display, each of the plurality of images generated in response to a single shooting instruction cannot be largely displayed and minutely checked in the review display. Therefore, even in a case where a variety of images are captured in response to a single shooting instruction, recognizing differences between images is difficult.

The techniques discussed in Japanese Patent Application Laid-Open No. 2001-145002 and Japanese Patent Application Laid-Open No. 2008-124826 take into consideration only group image display suitable for review display immediately after shooting. In other words, there has been proposed no technique of group image display suitable for each of review display immediately after shooting and reproduction mode display.

SUMMARY

An aspect of the present invention is generally directed to an imaging apparatus capable of performing such image display that allows a user to more effectively check images of a group composed of a plurality of images generated in response to a single shooting instruction.

According to an aspect of the present invention, an imaging apparatus includes an imaging unit, a control unit configured to perform control to cause the imaging unit to perform shooting to generate a plurality of images in response to a single shooting instruction, and a display control unit configured to, as automatically performed review display after shooting in response to the shooting instruction, perform control to sequentially display the plurality of generated images one by one on a display unit, and then display the plurality of images in a multi-display form on the same screen.

According to the present disclosure, an imaging apparatus is capable of performing such image display that allows a user to more effectively check images of a group composed of a plurality of images generated in response to a single shooting instruction.

Further features of the present disclosure will become apparent from the following description of exemplary embodiments with reference to the attached drawings.

BRIEF DESCRIPTION OF THE DRAWINGS

FIG. 10 is a flowchart illustrating intra-group image reproduction processing.

DESCRIPTION OF THE EMBODIMENTS

An exemplary embodiment will be described in detail below with reference to the accompanying drawings.

It is to be noted that the following exemplary embodiment is merely one example and can be appropriately modified or changed depending on individual constructions and various conditions of apparatuses to which the exemplary embodiment is applied. Thus, the following exemplary embodiment is not seen to be limiting in any way.

Figure 1A:
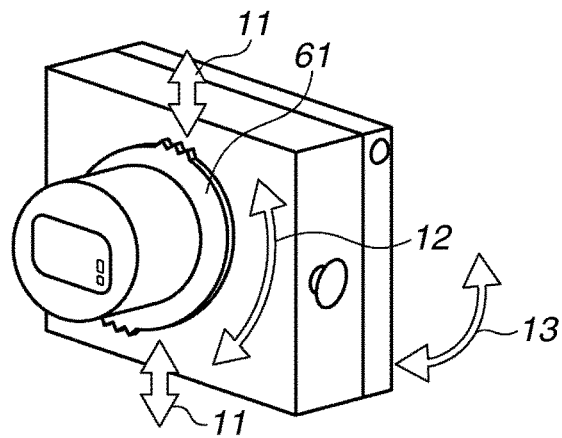
FIGS. 1A to 1C are external views illustrating a digital camera 100 according to an exemplary embodiment.
Figure 1B:
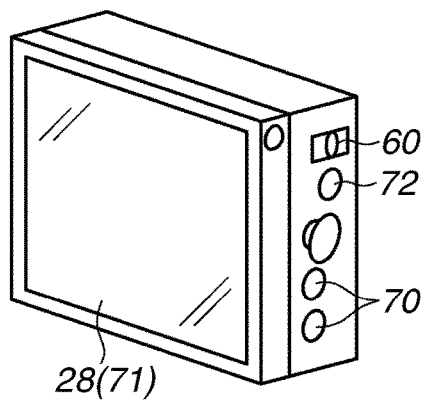
Figure 1C:
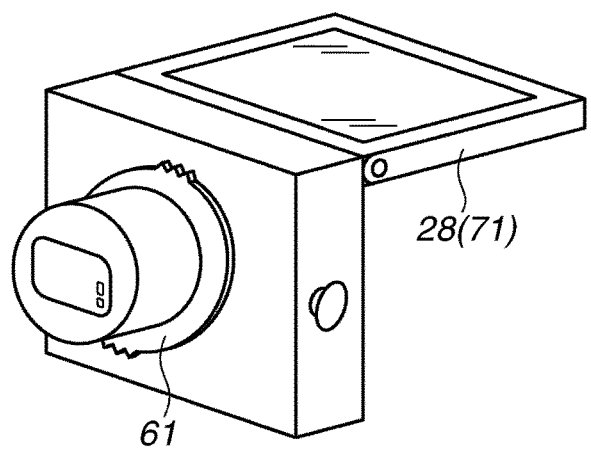

FIGS. 1A to 1C are external views illustrating a digital camera 100 as an example of an imaging apparatus according to the present exemplary embodiment. FIG. 1A is a front perspective view illustrating the digital camera 100. FIG. 1B is a rear perspective view illustrating the digital camera 100 when the tilt display panel is closed. FIG. 1C is a front perspective view illustrating the digital camera 100 when the tilt display panel is opened. A display unit 28 displays images and various information, and is integrally configured with a touch panel 71 included in an operation panel 70. A shutter operation unit 61 is an operation unit for instructing shooting. The shutter operation unit 61 is slidable in the directions perpendicular to the lens optical axis, indicated by the arrow 11. The shutter operation unit 61 can be half-pressed or full-pressed in each of the upward and downward directions. For example, slidably pressing the shutter operation unit 61 to the lower intermediate position, as indicated by the arrow 11, can set the shutter in the half-press state. Further slidably pressing the shutter operation unit 61 in the downward direction can set the shutter in the full-press state. Slidably pressing the shutter operation unit 61 in the upward direction in a similar way can set the shutter in the half-press and full-press states. When the shutter operation unit 61 is released, the shutter operation unit 61 returns to the intermediate position where the shutter is set neither in the full-press state nor in the half-press state. The shutter operation unit 61 is rotatable centering on the lens optical axis indicated by the arrow 12 to perform optical zooming by driving the zoom lens or to perform electronic zooming. That is, the shutter operation unit 61 is provided with not only a function of instructing shooting but also a function of what is called a zoom lever. A mode changing switch 60 is used to change the operation mode to any one of various modes. The operation panel 70 includes various switches, buttons, and the touch panel 71 which are operating members for receiving various operations from a user. A power switch 72 is a push button for turning the power ON and OFF. The display panel including the display unit 28 and the touch panel 71 can be opened and closed in the directions indicated by the arrow 13 with respect to the main body. As illustrated in FIG. 1C, the display panel can be opened by up to 90 degrees with the display unit 28 up. By holding the digital camera 100 at a lower position with the display panel opened, as illustrated in FIG. 1C, the user can view the display unit displaying the through image (live view image) from above, facilitating low-angle shooting. Further, by turning the digital camera 100 upside down with respect to the digital camera 100 illustrated in FIG. 1C and holding it above the user's head, the user can view the display unit 28 from below, facilitating high-angle shooting.

Figure 2:
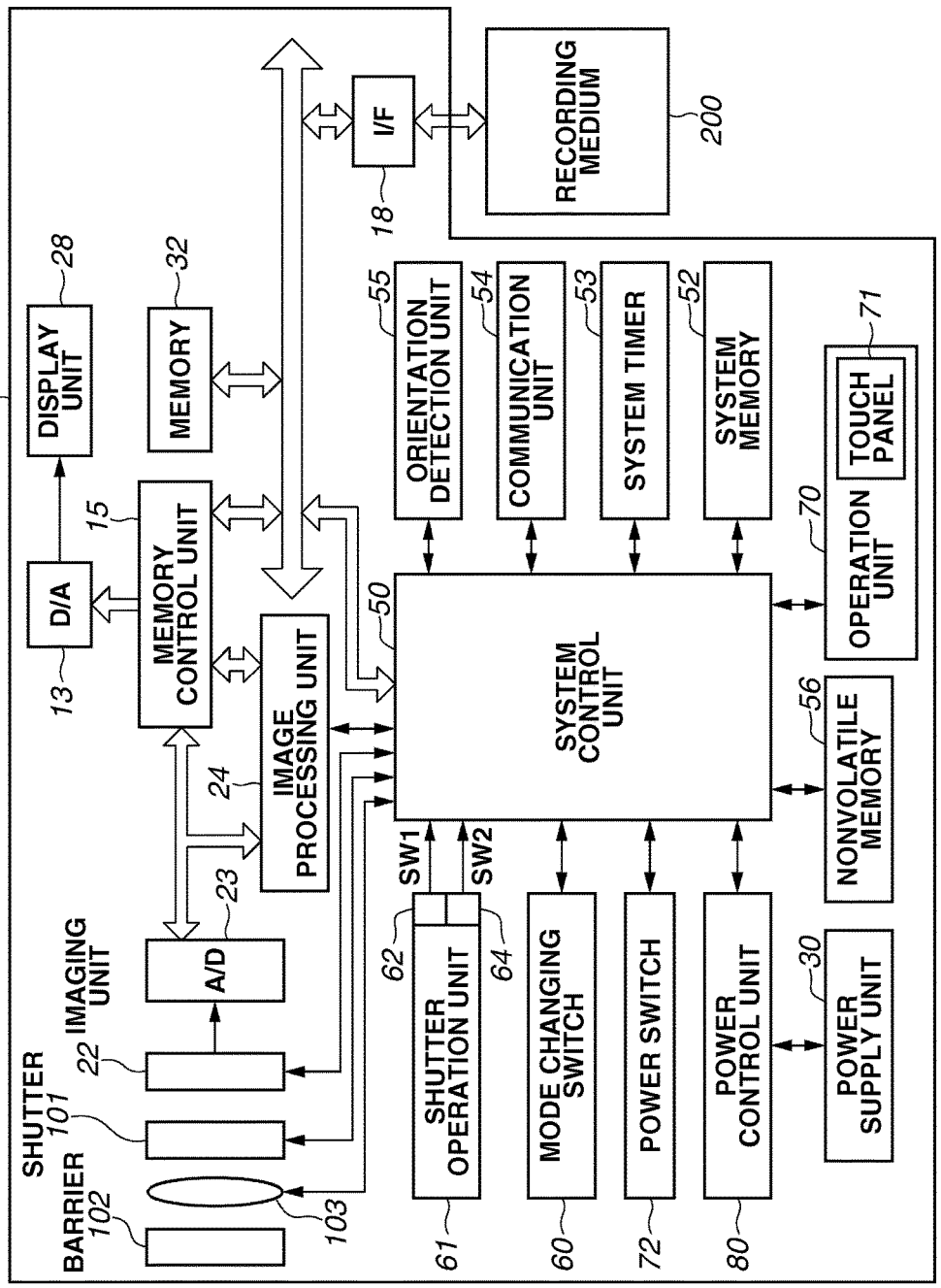
FIG. 2 is a schematic block diagram illustrating the digital camera 100 according to an exemplary embodiment.

FIG. 2 is a block diagram illustrating an example of a configuration of the digital camera 100 according to the present exemplary embodiment.

Referring to FIG. 2, a photographic lens 103 is a lens group including a zoom lens and a focus lens. A shutter 101 is provided with a diaphragm function. An imaging unit 22 is an image sensor including a charge-coupled device (CCD) or a complementary metal-oxide semiconductor (CMOS) element for converting an optical image into an electrical signal. An analog-to-digital (A/D) converter 23 converts an analog signal into a digital signal. The A/D converter 23 is used to convert an analog signal output from the imaging unit 22 into a digital signal. A barrier 102 covers the imaging system of the digital camera 100 including the photographic lens 103, the shutter 101, and the imaging unit 22 to prevent the imaging system from being soiled and damaged.

An image processing unit 24 performs predetermined pixel interpolation, resize processing (such as reduction), and color conversion processing on data from the A/D converter 23 and data from a memory control unit 15. The image processing unit 24 performs predetermined calculation processing by using captured image data. A system control unit 50 performs exposure control and focus control based on the obtained result of the calculation. Thus, through-the-lens (TTL) based automatic focus (AF) processing, automatic exposure (AE) processing, and electronic flash preliminary emission (pre-flash) processing are performed. The image processing unit 24 further performs predetermined data processing by using captured image data, and performs TTL-based automatic white balance (AWB) processing based on the obtained result of the calculation.

The data output from the A/D converter 23 is stored in a memory 32 via the image processing unit 24 and the memory control unit 15 or via the memory control unit 15. The memory 32 stores image data obtained by the imaging unit 22 and converted into digital data by the A/D converter 23, and stores image data to be displayed on the display unit 28. The memory 32 is provided with a memory capacity sufficient for storing a predetermined number of still images and predetermined time of moving images and sound.

The memory 32 also serves as a memory (video memory) for image display. A digital-to-analog (D/A) converter 13 converts the image data for display stored in the memory 32 into an analog signal, and supplies it to the display unit 28. In this way, the image data for display stored in the memory 32 is displayed on the display unit 28 via the D/A converter 13. According to the analog signal from the D/A converter 13, the display unit 28 displays the image data on a display, such as a liquid crystal display (LCD). The D/A converter 13 converts the digital signal, which is generated through A/D conversion and once stored in the memory 32 by the A/D converter 23, into an analog signal, and successively transmits it to the display unit 28. Thus, the display unit 28 functions as an electronic view finder to perform through image display (live view display).

A nonvolatile memory 56, which is an electrically erasable recordable memory such as an electrically erasable programmable read-only memory (EEPROM), stores constants, programs, and the like for operation of the system control unit 50. The programs are used to execute various flowcharts described below in the present exemplary embodiment.

The system control unit 50 controls the entire digital camera 100. The system control unit 50 executes the programs recorded on the above-described nonvolatile memory 56 to implement various processing according to the present exemplary embodiment (described below). A system memory 52 is a random access memory (RAM). The constants and variables for operation of the system control unit 50, and the programs read from the nonvolatile memory 56 are loaded into the system memory 52. The system control unit 50 also controls the memory 32, the D/A converter 13, and the display unit 28 to perform display control.

A system timer 53 is a clock unit for measuring time used for various control and time of a built-in clock.

The mode changing switch 60 and the operation panel 70 serve as operation units for inputting various operation instructions to the system control unit 50.

The mode changing switch 60 changes the operation mode of the system control unit 50 to any one of the still image recording mode, the moving image recording mode, and the reproduction mode. The still image recording mode includes the automatic shooting mode, the automatic scene determination mode, the manual mode, various scene modes (image capturing settings for various captured scenes), the programmed AE mode, and the custom mode. The mode changing switch 60 allows the user to directly change to any one of these modes included in the still image shooting mode. Alternatively, the user may once select the still image shooting mode by using the mode changing switch 60, and then select any one mode included in the still image shooting mode by using other operation members (shooting mode changeover). Similarly, the moving image shooting mode may include a plurality of modes. When the user operates halfway the shutter operation unit 61 provided on the digital camera 100, i.e., when the user half-presses it (shooting preparation instruction), the first shutter switch 62 turns ON to generate a first shutter switch signal SW1. In response to the first shutter switch signal SW1, the system control unit 50 starts an operation, such as AF processing, AE processing, AWB processing, and pre-flash processing.

When the user fully operates the shutter operation unit 61, i.e., when the user full-presses it (shooting instruction), the second shutter switch 64 turns ON to generate a second shutter switch signal SW2. In response to the second shutter switch signal SW2, the system control unit 50 starts a series of shooting operations ranging from reading a signal from the imaging unit 22 to storing image data in a recording medium 200.

The operation members on the operation panel 70 serve as various function buttons. More specifically, the operation members are assigned suitable functions for each scene when the user selects any one of various function icons displayed on the display unit 28. The function buttons include, for example, an end button, a return button, image advancing buttons, a jump button, a narrowing-down button, and an attribute change button. For example, when the user presses the menu button, the display unit 28 displays a menu screen allowing the user to make various settings.

A power control unit 80 includes a battery detecting circuit, a direct-current-to-direct-current (DC-DC) converter, and a switching circuit for switching a conductive block, and is configured to detect the presence or absence of a battery, the battery type, and the remaining battery capacity. The power control unit 80 controls the DC/DC converter based on the result of the detection and on an instruction from the system control unit 50 to supply a required voltage to each part including the recording medium 200 for a required time duration.

A power supply unit 30 includes a primary battery, such as an alkaline battery or a lithium battery, and a secondary battery, such as a nickel-cadmium (NiCd) battery, a nickel metal hydride (NiMH) battery, or a lithium-ion (Li) battery, and includes an alternating-current-to-direct-current (AC/DC) adaptor. A recording medium interface (I/F) 18 is an interface with the recording medium 200, such as a memory card and a hard disk. The recording medium 200 such as a memory card records captured images, and is composed of a semiconductor memory, or a magnetic disk.

A communication unit 54 is connected wirelessly or via a priority cable to transmit and receive moving image signals and sound signals. The communication unit 54 can also be connected with a wireless local area network (LAN) and the Internet. The communication unit 54 is able to transmit images (including the through image) captured by the imaging unit 22 and images recorded on the recording medium 200, and receive image data and other various information from external apparatuses.

An orientation detection unit 55 detects the orientation of the digital camera 100 with respect to the gravity direction. Based on the detected orientation by the orientation detection unit 55, the system control unit 50 can determine whether the image captured by the imaging unit 22 is an image captured with the digital camera 100 horizontally held or an image captured with the digital camera 100 vertically held. The system control unit 50 is able to append orientation information corresponding to the orientation detected by the orientation detection unit 55 to an image file of the image captured by the imaging unit 22, and rotate the image before recording. An acceleration sensor, a gyro sensor, etc. can be used as the orientation detection unit 55.

The operation unit 70 includes the touch panel 71 which can detect contact on the display unit 28. The touch panel 71 can be integrally configured with the display unit 28. For example, the touch panel 71 is configured so that the light transmissivity may not disturb the display of the display unit 28, and attached on the upper layer of the display surface of the display unit 28. Input coordinates on the touch panel 71 are associated with display coordinates on the display unit 28. This enables configuring a graphical user interface (GUI) which virtually allows the user to directly operate a screen displayed on the display unit 28. The system control unit 50 is able to detect the following operations performed on the touch panel 71 and the states thereof.

An action of touching the touch panel 71 with a finger or pen (hereinafter referred to as a touch-down)

A state where a finger or pen is in contact with the touch panel 71 (hereinafter referred to as a touch-on)

An action of moving a finger or pen held in contact with the touch panel 71 (hereinafter referred to as a touch-move)

An action of detaching a finger or pen from the touch panel 71 (hereinafter referred to as a touch-up)

A state where neither a finger nor a pen is in contact with the touch panel 71 (hereinafter referred to as a touch-off)

The above-described operations and states, and position coordinates of a touched position on the touch panel 71 are notified to the system control unit 50 via an internal bus. The system control unit 50 determines what operation has been performed on the touch panel 71 based on the notified information. With the touch-move, the moving direction of the finger or pen on the touch panel 71 can be determined for each of vertical and horizontal components on the touch panel 71 based on change in the position coordinates. When the user performs a touch-down, a touch-move over a certain distance, and a touch-up in this order on the touch panel 71, the system control unit 50 determines that a stroke has been drawn. An action of quickly drawing a stroke is referred to as a flick. The flick is an action of quickly moving the finger held in contact with the touch panel 71 over a certain distance and then detach the finger therefrom. In other words, the user quickly sweeps (or flips) the surface of the touch panel 71 with the finger. When the system control unit 50 detects a touch-move over a predetermined distance or longer at a predetermined speed or quicker and then detects a touch-up, the system control unit 50 determines that a flick has been performed. When the system control unit 50 detects a touch-move over a predetermined distance or longer, the system control unit 50 determines that a drag has been performed. The touch panel 71 may be of the resistive film type, capacitive type, surface acoustic wave type, infrared type, electromagnetic induction type, image recognition type, optical sensor type, and other various types.

The digital camera 100 is capable of shooting in the multishot mode. The multishot mode is provided as one shooting mode included in the still image shooting mode. The user can change the mode to the multishot mode by operating the mode changing switch 60. In the multishot mode, in response to one full-press operation of the shutter operation unit 61, the system control unit 50 performs shooting three times with different exposures and focus positions to generate three different RAW images in the memory 32. Then, in the post-processing after shooting, the system control unit 50 eventually generates six images based on the three RAW images, and stores them in the recording medium 200. When performing shooting three times, there may be a case where performing shooting three times with three different exposure values, and a case where performing shooting three times with three different focus positions. The system control unit 50 automatically changes the shooting method based on the result of shooting scene analysis. Further, when generating six images in the post-processing, the system control unit 50 performs a combination of image processing, such as blur processing, color filter processing, and trimming on arbitrary images out of the three RAW images to eventually generate six images. Although the six generated images are acquired by shooting an identical object in a short time duration, they are varied images having different combinations of composition, color, brightness, focus, and so on. Therefore, even a user unfamiliar with digital camera operations and even a user unfamiliar with composition setting are able to capture interesting images having different atmospheres even for an identical object.

Figure 3:
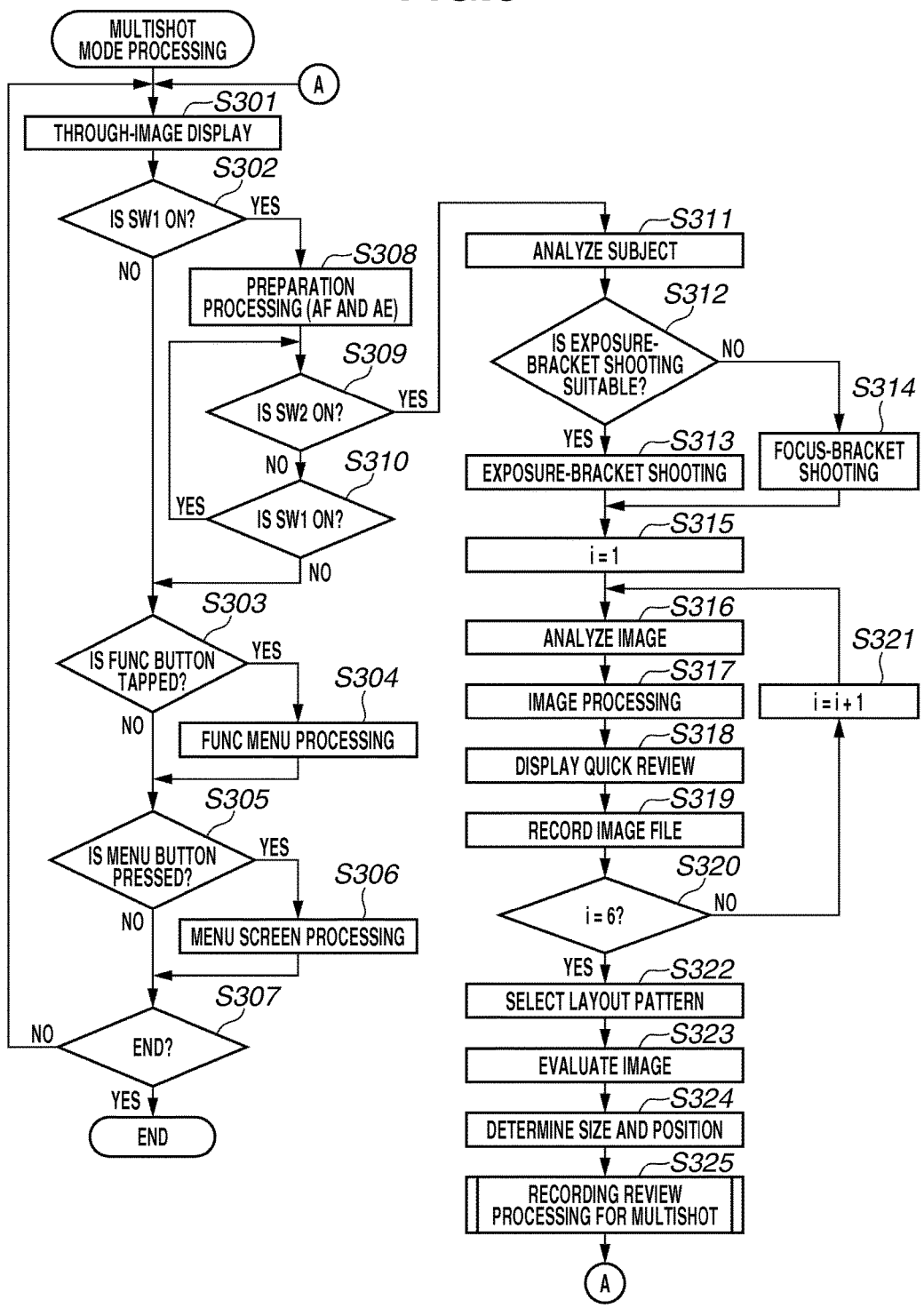
FIG. 3 is a flowchart illustrating multishot mode processing.

FIG. 3 is a flowchart illustrating multishot mode processing. This processing is implemented when the system control unit 50 loads a relevant program recorded on the nonvolatile memory 56 into the system memory 52 and then executes it. When the user operates the mode changing switch 60 to change the mode to the multishot mode, the system control unit 50 starts the processing illustrated in FIG. 3.

In step S301, the system control unit 50 displays the through image (live view) which displays the image captured by the imaging unit 22 almost in real time.

Figure 5:
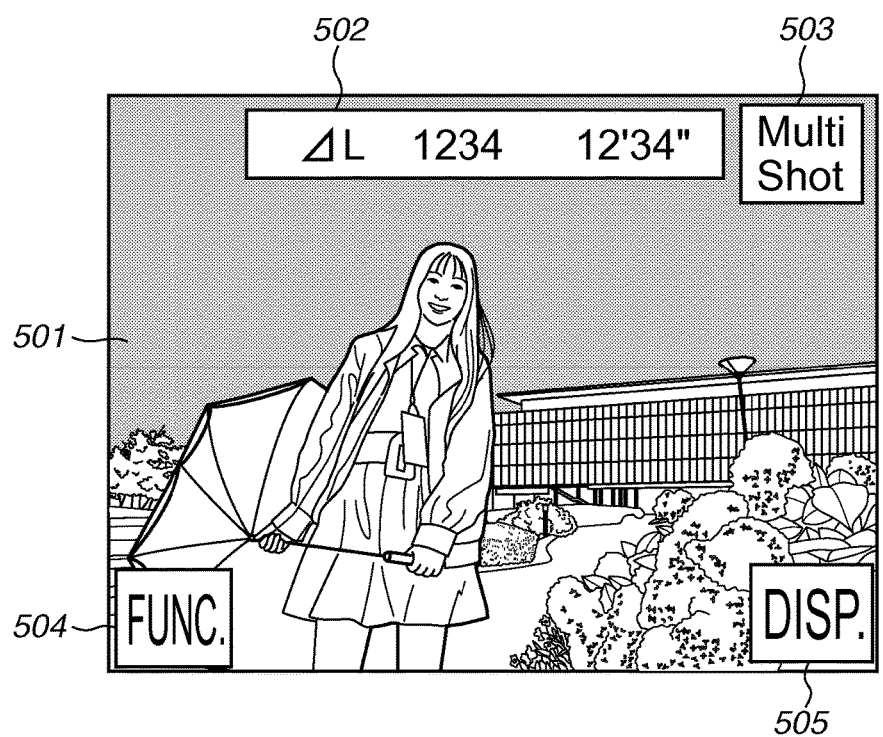
FIG. 5 illustrates an example of a through image displayed in the multishot mode.
Figure 6A:
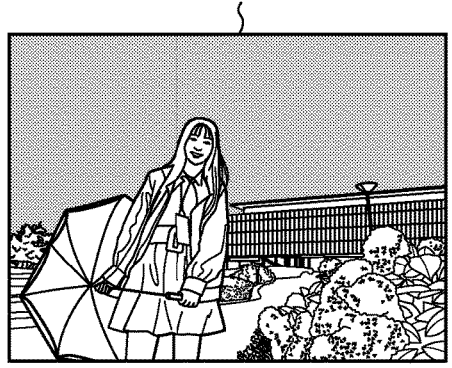
FIGS. 6A to 6F illustrate examples of quick reviews displayed in the multishot mode.
Figure 6D:
Figure 6B:
Figure 6E:
Figure 6C:
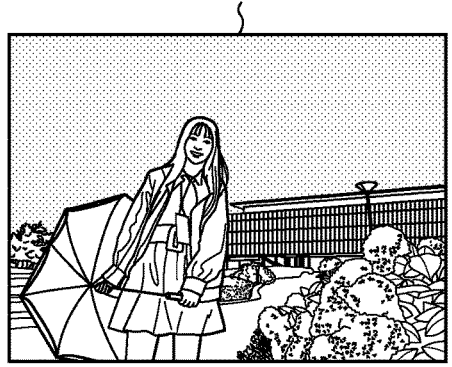
Figure 6F:
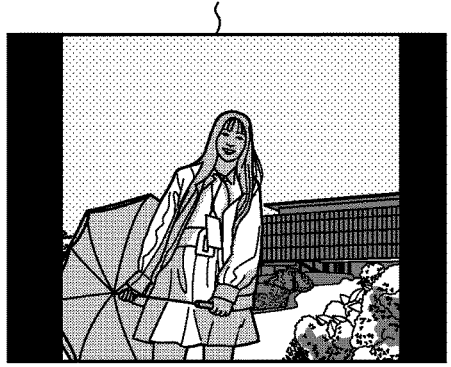

FIG. 5 illustrates an example of a through image displayed on the display unit 28 in the multishot mode. The through image 501 is a through image (live view image) of the subject currently being captured. A dialog 502 displays shooting conditions (shooting settings) currently set in the digital camera 100. Referring to FIG. 5, from left to right, the dialog 502 indicates that the image compression rate is low, the number of pixels is L size, the remaining number of issuable shooting instructions in the multishot mode is "1234", and the remaining shooting time of moving images is "12 minutes and 34 seconds". The remaining number of issuable shooting instructions is calculated by dividing the number of capturable still images (7404 in this example) according to the remaining capacity of the recording medium 200 by the number of images generated with a single shooting instruction in the multishot mode (e.g., 6), which indicates that how many shooting instructions can be issued. A MultiShot mode icon 503 indicates that the current shooting mode is the multishot mode. By touching the MultiShot mode icon 503, the user can display a shooting mode change screen to change the mode to other shooting modes. A FUNC button 504 is a touch icon for displaying a FUNC menu. When the user touches the FUNC button 504, the system control unit 50 superimposes the FUNC menu onto the through image. In the screen in which the FUNC menu is displayed, the user can set various shooting conditions. A DISP button 505 is a touch button for selecting other display modes with different types and amounts of information to be superimposed onto the through image.

In step S302, the system control unit 50 determines whether the shutter operation unit 61 has been half-pressed to set SW1 to ON. When it is determined that SW1 has been set to ON (YES in step S302), the processing proceeds to step S308. Otherwise (NO in step S302), the processing proceeds to step S303. When the touch shutter is enabled, SW1 is set to ON also when a touch-down is performed on the through image in the touch panel 71.

In step S303, the system control unit 50 determines whether a tap operation on the FUNC button 504 has been performed. The "tap operation" is an operation in which the touch panel 71 is touched and a touch-up is detected on the FUNC button 504 without detecting a touch-move over a predetermined distance or longer. Although, in the present exemplary embodiment, the FUNC button 504 is described as a touch button which is a soft key, the FUNC button 504 may be provided as a hardware key. When it is determined that a tap operation on the FUNC button 504 has been performed (YES in step S303), the processing proceeds to step S304. Otherwise (NO in step S303), the processing proceeds to step S305.

In step S304, the system control unit 50 superimposes onto the through image the FUNC menu including menu items for setting various shooting conditions, such as the number of pixels to be recorded, the compression rate, the flash light emission, and the self-timer setting. Then, the system control unit 50 sets the shooting conditions according to user operations received while the FUNC menu is displayed.

In step S305, the system control unit 50 determines whether the Menu button included in the operation panel 70 has been pressed. Although the Menu button is described as a hardware button, it may also be a soft key displayed in the touch panel 71. When it is determined that the Menu button has been pressed (YES in step S305), the processing proceeds to step S306. Otherwise (NO in step S305), the processing proceeds to step S307.

In step S306, the system control unit 50 displays a Menu screen on the display unit 28. The Menu screen is a setting menu including menu items different from those included in the above-described FUNC menu. The Menu screen includes setting items for automatic focus, setting items for specifying whether face detection is to be performed, setting items for specifying whether the touch shutter is enabled or disabled, and setting items for the recording review timer (described below). As setting items for the recording review timer, the user can set any one of no recording review (0-second review time), 0.5-second review time, 2-second review time, 10-second review time, and hold (a setting for not automatically ending the multishot mode according to time). The system control unit 50 performs various settings according to user operations received while the Menu screen is displayed. The setting values are stored in the nonvolatile memory 56.

In step S307, the system control unit 50 determines whether an event for ending the multishot mode has occurred, such as an instruction for shifting the mode to other modes through an operation of the mode changing switch 60 and an instruction for turning the power OFF by pressing the power switch 72. When it is determined that an event for ending the multishot mode has occurred (YES in step S307), the processing is terminated. When it is determined that an event for ending the multishot mode has not occurred (NO in step S307), the processing returns to step S301. Then, the system control unit 50 repeats the relevant processing.

In step S308, in response to an event that SW1 is ON, the system control unit 50 performs shooting preparation processing, such as AF and AE.

In step S309, the system control unit 50 determines whether SW2 has been ON, for example, by full-pressing the shutter operation unit 61. When it is determined that SW2 has been ON (YES in step S309), the processing proceeds to step S311. Otherwise (NO in step S309), the processing proceeds to step S310. When the touch shutter is enabled, SW2 will be ON also by a touch-up in a touch operation continued from a touch-down that has triggered causing SW1 to be ON.

In step S310, the system control unit 50 determines whether SW1 remains to be ON. When it is determined that SW1 remains to be ON (YES in step S310), the processing returns to step S309. On the other hand, when it is determined that SW1 has been OFF (NO in step S310), the processing proceeds to step S303.

In step S311, the system control unit 50 analyzes the subject which is currently being captured based on the through image captured by the imaging unit 22. For example, the system control unit 50 determines whether the detected subject, such as a face and an object, is at rest, whether the main object is distant from other subjects, whether the current scene is a backlight scene, and whether the subject is moving.

In step S312, based on the result of the analysis in step S311, the system control unit 50 determines whether exposure-bracket shooting is to be performed. Exposure bracket shooting refers to a method for capturing a plurality of images by automatically and minutely changing the exposure setting based on combinations of the shutter speed and the diaphragm. The system control unit 50 determines that exposure-bracket shooting is to be performed, for example, when it is determined that the current scene is a backlight scene in step S311. On the other hand, the system control unit 50 determines that focus-bracket shooting is to be performed, instead of exposure-bracket shooting, when it is determined that the subjects are stationary and distant from each other. When it is determined that the exposure-bracket shooting is to be performed (YES in step S312), the processing proceeds to step S313. Otherwise (NO in step S312), the processing proceeds to step S314.

In step S313, the system control unit 50 performs exposure-bracket shooting. Specifically, the system control unit 50 successively performs shooting three times (continuous shooting) while changing the exposure setting to three different values: a regular value (suitable value), an under-exposure-biased value (darkish), and an overexposure-biased value (brightish). In this way, the system control unit 50 performs shooting a plurality of number of times. Thus, three different RAW images are captured.

In step S314, the system control unit 50 performs focus-bracket shooting. In focus-bracket shooting, the system control unit 50 successively performs shooting three times (continuous shooting) while automatically changing the focus position to the in-focus position, to the front side from the in-focus position, and to the back side from the in-focus position so that each image has a different focus position. In this way, the system control unit 50 performs shooting a plurality of number of times. Thus, three different RAW images (data before being subjected to development processing including demosaic processing) are captured.

In step S315, to count the number of images generated, the system control unit 50 sets a variable i stored in the system memory 52 to "1" (initial value).

In step S316, the system control unit 50 analyzes the captured RAW images to determine image processing for generating an image as the i-th image. For example, the system control unit 50 performs face detection as image analysis, and determines to perform trimming processing according to the position and size of the detected face. To generate at least one regular image not subjected to special processing, the system control unit 50 determines not to perform special image processing (except processing required to generate a regular image) when the variable i=1. To prevent that the six images generated in response to a single shooting instruction include similar images, the system control unit 50 further determines to set different image processing conditions for respective different values of the variable i.

In step S317, the system control unit 50 performs the image processing determined in step S316 on any one of the three RAW images to generate a visualized image (developed image). In this case, the system control unit 50 performs any one or a combination of trimming processing (including aspect ratio change processing), blur processing, and color processing. The blur processing includes processing for softening the edges of objects other than the subject determined to be the main object or the central portion of the image (such as diorama image processing). The color processing includes processing for converting an image to a monochrome image, processing for converting an image to a monochrome image except for one color (one point color processing), processing for converting an image to a sepia image, and processing for darkening the periphery of an image (to generate a toy-camera-like image). The color processing further includes processing for emphasizing warm colors, processing for emphasizing cold colors, processing for decreasing saturation, and processing for increasing saturation. When the variable i=1, the system control unit 50 generates a visualized image based on one particular image out of the three RAW images. In the case of exposure-bracket shooting, the particular image is an image captured with suitable exposure (regular exposure). In the case of focus-bracket shooting, the particular image is an image captured with the in-focus position.

In step S318, upon completion of the image processing in step S317, the system control unit 50 displays the images generated in the image processing performed in step S317 on the display unit 28 as quick review images. The quick review images are displayed one by one.

In step S319, the system control unit 50 records the images generated in step S317 on the recording medium 200 as image files. Each of the image files of the six images included in one set of images generated in response to a single shooting instruction is supplied with an identifier as attribute information indicating that the relevant image belongs to an identical group captured in response to an identical shooting instruction. For example, each file belonging to the same group is supplied with an identical group identifier as header information for each image file. This group identifier enables identifying that these images are mutually related.

In step S320, the system control unit 50 determines whether the variable i=6, i.e., whether six images (all images in the group) have been generated. When it is determined that the variable i is "6" (YES in step S320), the processing proceeds to step S322. Otherwise (NO in step S320), then in step S321, the system control unit 50 increments the variable i, and returns to step S316 to generate the following image of the same group. The system control unit 50 repeats this processing until the variable i reaches 6. In step S318, the generated images are displayed one by one.

FIGS. 6A to 6F illustrate examples of quick reviews displayed in step S318 repeated six times for the variable i=1 to 6. The following images 601 to 606 generated by the processing for the variable i=1 to 6 are sequentially displayed on the display unit 28 in this order. The display duration for each image depends on the time of image processing taken to generate the following images in step S317.

1. The image 601 illustrated in FIG. 6A: A RAW image (original image) captured with suitable exposure or at the in-focus position not having undergone special processing (an image having undergone standard processing). This image is a standard image. The same image processing is applied to this image and to an image captured in the automatic shooting mode.
2. The image 602 illustrated in FIG. 6B: Generated by automatically applying to the original image (RAW image) of the image 601 trimming processing with an aspect ratio of 3:4 (vertically long) based on the position and size of the person's face, and color processing for color lightening.
3. The image 603 illustrated in FIG. 6C: Generated by applying fading color processing to an image captured in exposure-bracket shooting with different exposure from the one in capturing the image 601.
4. The image 604 illustrated in FIG. 6D: Generated by applying to the original image (RAW image) of the image 603 trimming processing with an aspect ratio of 1:1 based on the position and size of the face, and monochromatic color processing.
5. The image 605 illustrated in FIG. 6E: Generated by applying trimming processing with an aspect ratio of 3:4 (vertically long) not based on the face, to the original image (RAW image) captured with different exposure from the one in capturing the images 601 and 603.
6. The image 606 illustrated in FIG. 6F: Generated by applying to the original image (RAW image) of the image 605 trimming processing with an aspect ratio of 1:1 (not based on the face), and color processing for increasing saturation.

Figure 7A:
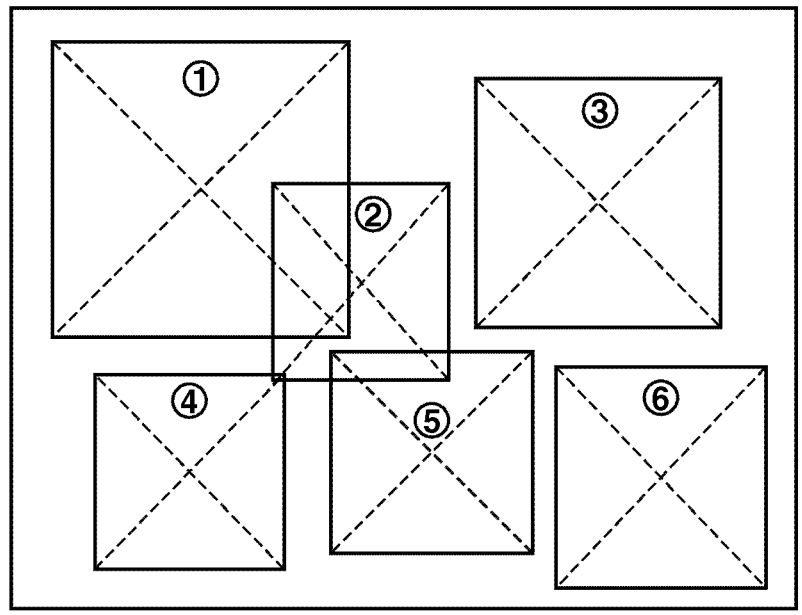
FIGS. 7A and 7B illustrate examples of layout templates for recording reviews displayed in the multishot mode.
Figure 7B:
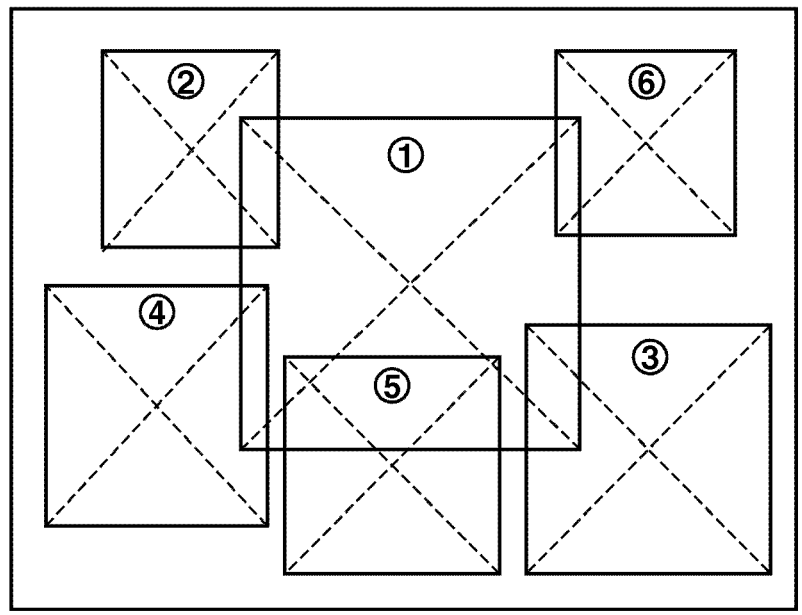

In step S322, the system control unit 50 selects a layout pattern used when displaying the six generated images on the same screen as a recording review screen. A plurality of layout patterns is pre-recorded on the nonvolatile memory 56. The system control unit 50 selects at random any one of the plurality of layout patterns. FIGS. 7A and 7B illustrate examples of layout patterns stored in the nonvolatile memory 56. Referring to FIGS. 7A and 7B, six areas where respective images should be arranged are defined with an aspect ratio of 1:1. Priorities 1 to 6 are assigned (defined) to respective areas. The six areas have respectively different sizes (areas). An actually generated image (not necessarily with an aspect ratio of 1:1) is enlarged or reduced to the maximum size which fits into the frame indicating the display area of each image, and then displayed with the center of the image aligned to a position in a frame. In either layout pattern, the area having priority 1 has a larger area than any other areas.

In step S323, the system control unit 50 analyzes and evaluates the six generated images (images 601 to 606), and determines the priority of each image. Evaluation criteria include the configuration and contrast of the subject. There may be various methods for evaluating images, and detailed description will be omitted. In the present exemplary embodiment, the regular image (image 601) generated when the variable i=1, not having undergone special processing, is given the highest evaluation value so that it has the highest priority.

In step S324, the system control unit 50 assigns an image having the priority corresponding to the result of the image evaluation in step S323 to each area defined in the layout pattern selected in step S322 (display position determination). The system control unit 50 further resizes an image assigned to each area of the layout pattern so that the image fits into the frame of the relevant area (size determination).

In step S325, the system control unit 50 performs processing (recording review processing for multishot) for displaying a set of a plurality of images on the same screen based on the size and position of each image determined in step S324. The recording review processing for multishot will be described in detail below with reference to FIG. 4. Upon completion of the recording review processing for multishot, the processing returns to step S301. Then, the system control unit 50 repeats the relevant processing.

Figure 4:
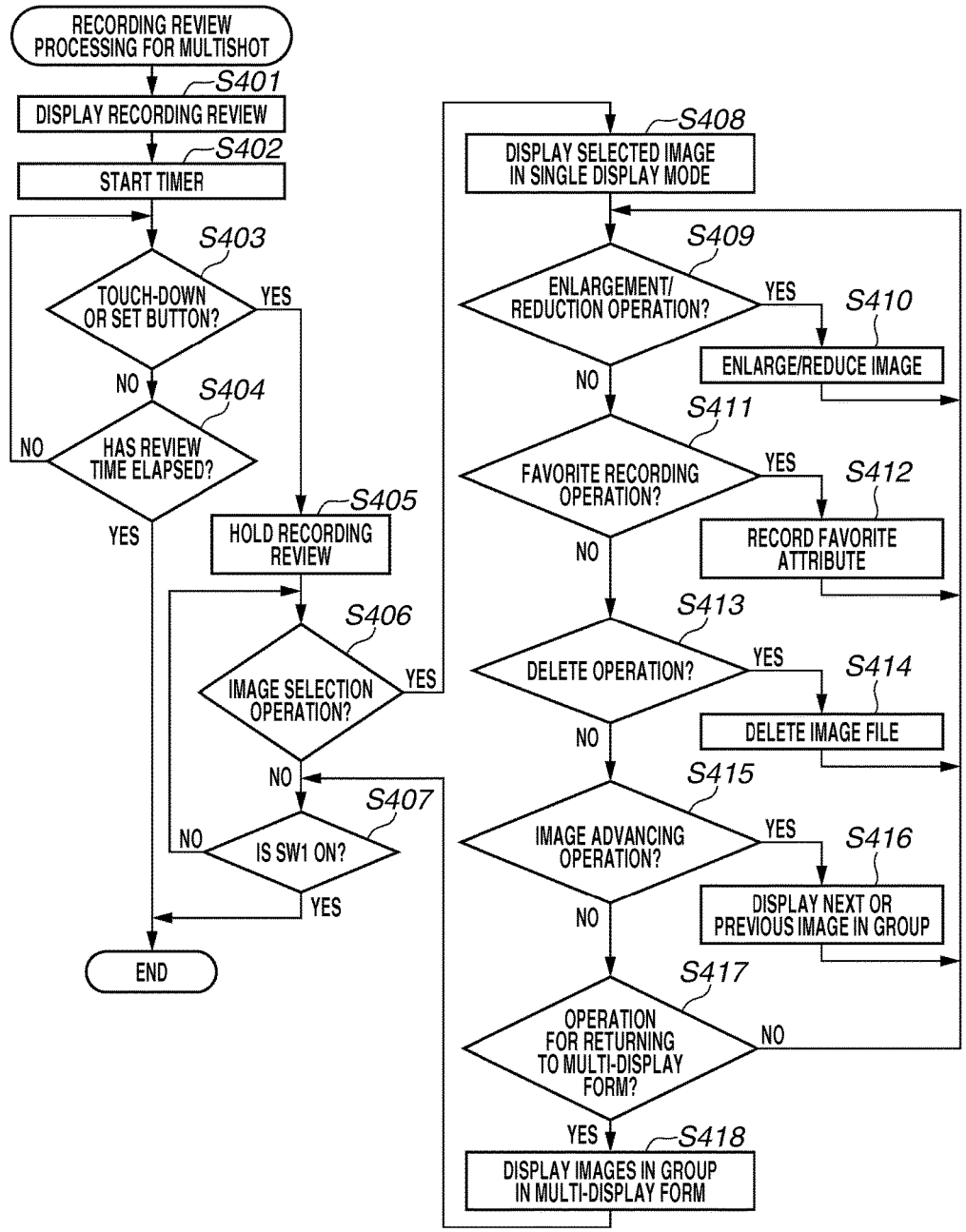
FIG. 4 is a flowchart illustrating review processing for multishot.

FIG. 4 is a flowchart illustrating the recording review processing for multishot. This processing indicates details of the processing in step S325 illustrated in FIG. 3. The processing is implemented when the system control unit 50 loads a relevant program recorded on the nonvolatile memory 56 into the system memory 52 and then executes it.

Figure 8A:
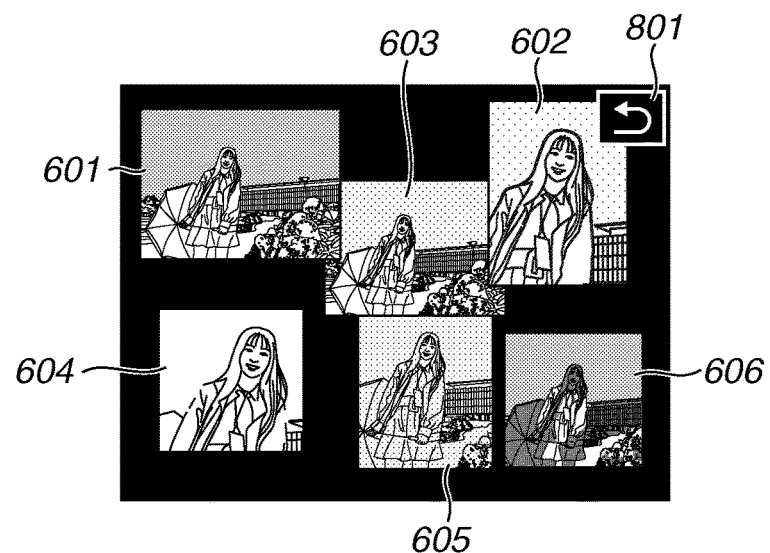
FIGS. 8A to 8C illustrate examples of recording reviews displayed in the multishot mode.

In step S401, the system control unit 50 displays recording review images. FIG. 8A illustrates an example of a recording review displayed on the display unit 28. In recording review display for multishot, the images 601 to 606 (a set of images generated with a single shooting instruction) are arranged on a same screen based on the layout pattern selected in step S322 and the image evaluation determined in step S323 illustrated in FIG. 3. Since the size of the display area differs for each image defined in the layout pattern, the six images displayed on the same screen are displayed in respectively different sizes. The layout is aligned neither in the vertical direction nor in the horizontal direction. Therefore, the user does not receive a monotonous impression from each of the recording review images illustrated in FIG. 8A but is highly likely to have different impressions from respective images. Therefore, the user can understand that a variety of images having different impressions have been captured in response to a single shooting instruction, and can be interested in shooting. In other words, the user can realize that images having various impressions can be easily captured simply by operating the shutter operation unit 61 only once. A return button 801 is a touch icon. In response to a tap operation on the return button 801, the system control unit 50 ends the recording review display and displays the through image.

In step S402, the system control unit 50 starts countdown of the timer (review time) for automatically ending the recording review display. The review time is preset in the above-described Menu screen.

In step S403, the system control unit 50 determines whether the user has performed a touch-down on the touch panel 71 or has pressed the SET button included in the operation panel 70. When it is determined that a touch-down has been performed or the SET button has been pressed (YES in step S403), the processing proceeds to step S405. Otherwise (NO in step S403), the processing proceeds to step S404.

In step S404, the system control unit 50 determines whether the review time has elapsed since the timer was started in step S402. When it is determined that the review time is has not elapsed (NO in step S404), the processing returns to step S403. On the other hand, when it is determined that the review time has elapsed (YES in step S404), the system control unit 50 ends the recording review display, then in step S301 in FIG. 3, the system control unit 50 displays the through image.

In step S405, the system control unit 50 stops and resets the timer started in step S402 to hold the recording review display. In the hold state, the system control unit 50 does not automatically end the recording review display according to the recording review timer but continues the recording review display performed in step S401 until reception of a user instruction. Even in the hold state of the recording review display, when a predetermined time longer than the recording review timer has elapsed since no operation is performed, the system control unit 50 ends the display to save power.

In step S406, the system control unit 50 determines whether the user has performed an operation for selecting any one of a plurality of images displayed in recording review. For example, by touching the display area of any one of the images 601 to 606 displayed on the display unit 28 as illustrated in FIG. 8A, the user can select the touched image. Alternatively, the user moves the image selection cursor by using the direction buttons included in the operation panel 70, and presses the determination button included in the operation panel 70 to select the image currently selected by the image selection cursor. When any one image has been selected (YES in step S406), the processing proceeds to step S408. On the other hand, when no image has been selected (NO in step S406), the processing proceeds to step S407.

In step S407, the system control unit 50 determines whether SW1 has been ON. When it is determined that SW1 has been ON (YES in step S407), the system control unit 50 ends the recording review display, then in step S301 in FIG. 3, the system control unit 50 displays the through image. On the other hand, when it is determined that SW1 has not been ON (NO in step S407), the processing returns to step S406.

Figure 8B:
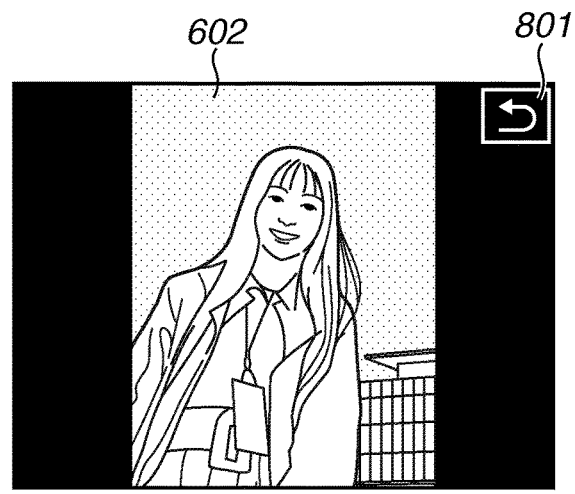

In step S408, the system control unit 50 displays the image selected in step S406 in the entire display unit 28 in single display form (single image display mode) in which an image is displayed full-screen. For example, when the user touches the image 602 illustrated in FIG. 8A, the image 602 is displayed full-screen (the entire image is displayed in maximum size of the display area), as illustrated in FIG. 8B. The return button 801 illustrated in FIG. 8B is a touch button for ending the recording review display and returning to the through image display. When the user touches the return button 801, the processing proceeds to step S301 illustrated in FIG. 3 even during processing illustrated in FIG. 4.

In step S409, the system control unit 50 determines whether the user has performed an operation for enlarging or reducing the displayed image. When the system control unit 50 detects a pinch-out operation in which the user performs a touch-move so as to separate two fingers from each other held in contact with the touch panel 71, or an operation for rotating the shutter operation unit 61 (also serving as the zoom lever) toward the telephoto side, the system control unit 50 determines that the user has performed an enlargement operation. When the system control unit 50 detects a pinch-in operation in which the user performs a touch-move so as to bring two fingers closer to each other held in contact with the touch panel 71, or an operation for rotating the shutter operation unit (also serving as the zoom lever) toward the wide-angle side, the system control unit 50 determines that the user has performed an reduction operation. When it is determined that the enlargement or reduction operation has been performed (YES in step S409), the processing proceeds to step S410. Otherwise (NO in step S409), the processing proceeds to step S411.

In step S410, the system control unit 50 enlarges or reduces the image displayed on the display unit 28 in response to the enlargement or reduction operation detected in step S409.

In step S411, the system control unit 50 determines whether the user has performed an operation for giving "favorite" to the image displayed on the display unit 28. When it is determined that an operation for giving "favorite" has been performed (YES in step S411), the processing proceeds to step S412. Otherwise (NO in step S411), the processing proceeds to step S413.

In step S412, the system control unit 50 gives (records) the favorite attribute to the header portion of an image file in which the image displayed on the display unit 28 is stored.

In step S413, the system control unit 50 determines whether the user has performed an operation for instructing deletion of the image displayed on the display unit 28. When it is determined that an operation for instructing deletion of the image has been performed (YES in step S413), the processing proceeds to step S414. Otherwise (NO in step S413), the processing proceeds to step S415.

In step S414, the system control unit 50 deletes from the recording medium 200 the image file in which the image displayed on the display unit 28 is stored.

In step S415, the system control unit 50 determines whether the user has performed an image advancing operation, i.e., an instruction for changing the current image to the previous or following image. The image advancing operation can be performed, for example, with a flick operation on the touch panel 71. For example, when the user performs a flick operation once to the right (hereinafter referred to as a right-flick), the system control unit 50 receives it as an instruction for changing the current image to the preceding image. When the user performs a flick operation once to the left (hereinafter referred to as a left-flick), the system control unit 50 receives it as an instruction for changing the current image to the following image.

In step S416, the system control unit 50 changes the currently displayed image by performing an image advancing operation. Since the system control unit 50 displays the recording review, the system control unit 50 performs the image advancing operation only for images in the same group generated in response to a single shooting instruction. For example, when the image 602 is displayed in single display form, a right-flick operation changes the current image to the image 601, and a left-flick operation changes the current image to the image 603. When the user performs a right-flick when the image 601 is displayed, the system control unit 50 changes the current image to the image 606 and does not change the current image to any other images than the images generated in the present shooting.

In step S417, the system control unit 50 determines whether the user has performed an operation for returning to the multi-display. The user can return the display state to the multi-display by performing a pinch-in operation (reduction operation) in a state where an image is not displayed full-screen (single display form), or an operation for rotating the shutter operation unit 61 (also serving as the zoom lever) toward the wide angle side. When it is determined that an operation for returning to the multi-display has been performed (YES in step S417), the processing proceeds to step S418. Otherwise (NO in step S417), the processing returns to step S409. Then, the system control unit 50 repeats the relevant processing.

Figure 8C:
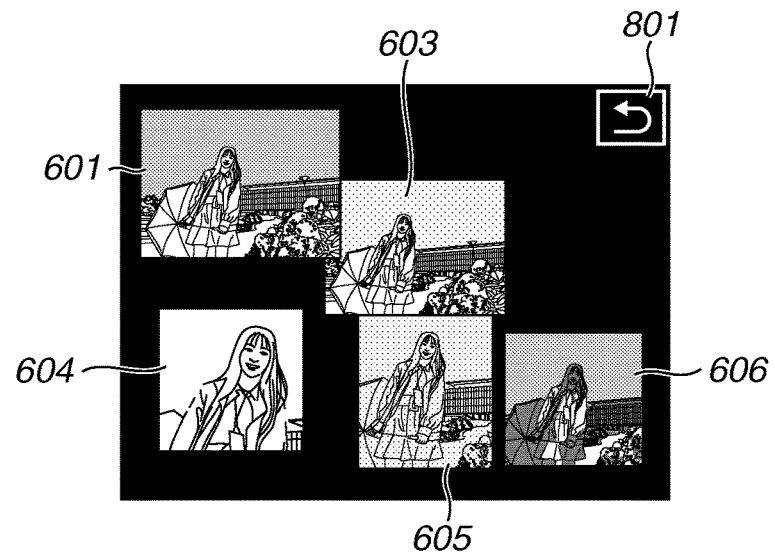

In step S418, similar to step S401, the system control unit 50 arranges and displays in multi-display form the images in the same group generated by the present shooting. In this case, when any image was deleted in step S414, the system control unit 50 displays the remaining images without changing the layout displayed in step S401, i.e., only the deleted image is simply hidden. In other words, the display position and size of any other images than the deleted image remain unchanged. For example, FIG. 8C illustrates a case where the image 602 is deleted. Referring to FIG. 8C, the display position and size of the remaining images (any other images than the deleted image 602) remain unchanged from the images illustrated in FIG. 8A displayed in step S401. This makes it easier for the user to recognize which image out of the images illustrated in FIG. 8A has been deleted. Further, if the layout is changed n such a manner that the remaining images are displayed covering the position of the deleted image, a low-evaluation image may be displayed at a position where a high-evaluation image should be displayed. In this case, the user may possibly misunderstand that the low-evaluation image has high image evaluation. However, displaying the remaining images by maintaining the layout (by simply hiding the deleted image) as with the present exemplary embodiment enables preventing such misunderstanding.

Next, how the image group captured in the multishot mode is reproduced will be described.

Figure 9:
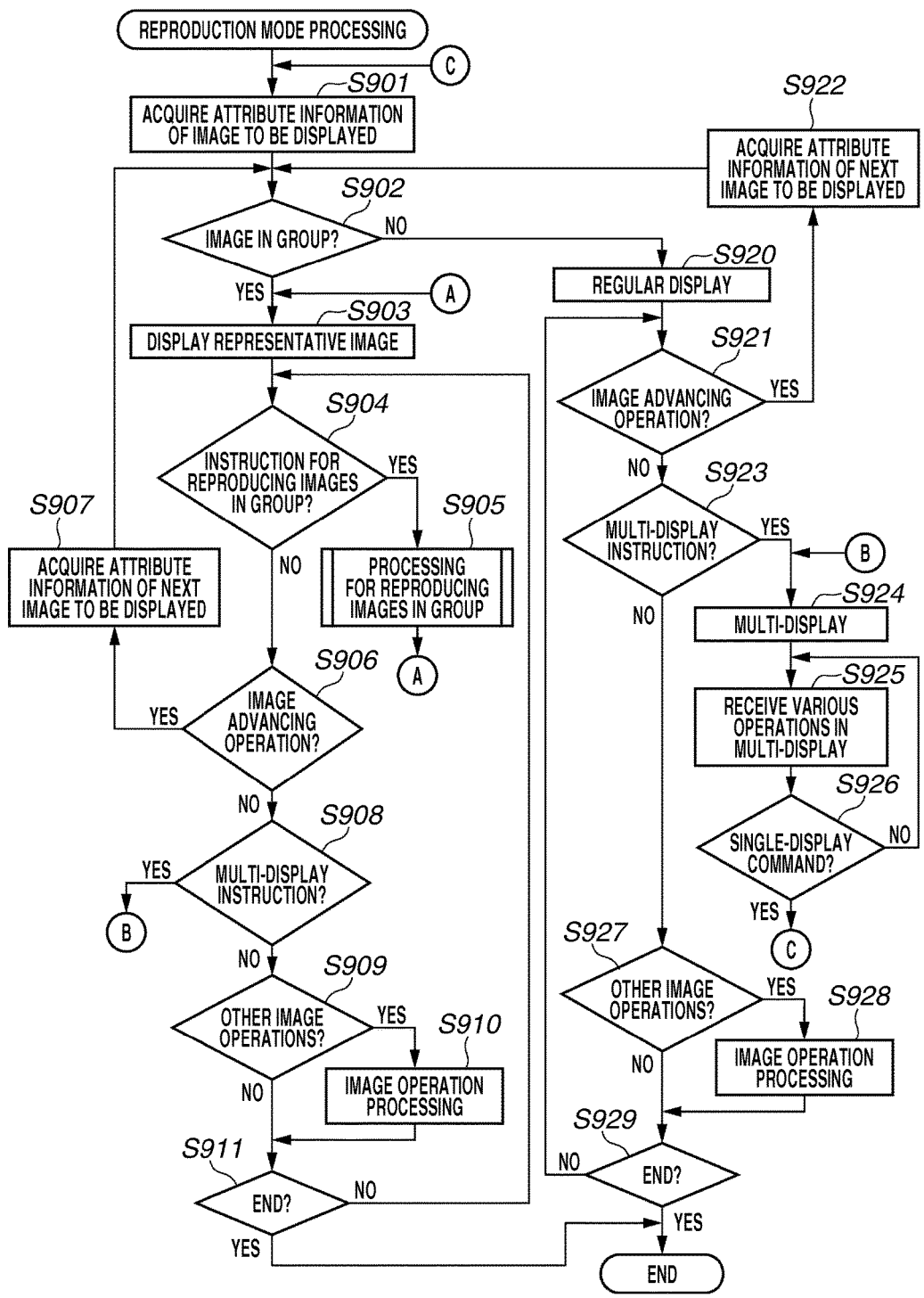
FIG. 9 is a flowchart illustrating reproduction mode processing.

FIG. 9 is a flowchart illustrating the reproduction mode processing according to the present exemplary embodiment. This processing is implemented when the system control unit 50 loads a relevant program recorded on the nonvolatile memory 56 into the system memory 52 and then executes it. When the user operates the mode changing switch 60 to change the mode to the reproduction mode, or when the user presses the reproduction button included in the operation panel 70, the system control unit 50 starts the processing illustrated in FIG. 9.

In step S901, the system control unit 50 acquires from the image file recorded on the recording medium 200 the attribute information of the image to be displayed, and stores the attribute information in the system memory 52. If a new image has been appended to the recording medium 200 after exiting the reproduction mode last, the image to be displayed first upon entry to the reproduction mode is the latest image. On the other hand, when no file has been appended to the recording medium 200 after exiting the reproduction mode last, the image to be displayed first upon entry to the reproduction mode is the image last displayed when the reproduction mode was exited.

In step S902, based on the acquired attribute information, the system control unit 50 determines whether the image to be displayed is an intra-group image (an image belonging to the group). When a group identifier is has been given to the image to be displayed (YES in step S902), the system control unit 50 determines that the image belongs to the group, and the processing proceeds to step S903. When the group identifier has not been given to the image to be displayed (i.e., when the image is captured neither in the above-described multishot mode nor in continuous shooting) (NO in step S902), the processing proceeds to step S920.

In step S903, the system control unit 50 displays a representative image of the group including the image to be displayed first. In the present exemplary embodiment, the representative image is the first image of the group. Thus, the system control unit 50 searches for an image having the smallest file number out of intra-group images having the same group identifier as the image to be displayed first, and displays the image as a representative image. The representative image is not limited to the first image.

Figure 11A:
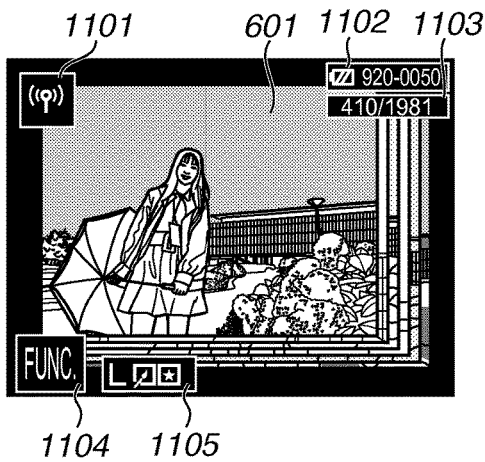
FIGS. 11A to 11E illustrate examples of group images displayed in the reproduction mode.

FIG. 11A illustrates an example of the group's representative image displayed in step S903. Since the image 601 is the first image of the one set of the images 601 to 606, the entire image 601 is displayed as a representative image, as illustrated in FIG. 11A. However, the images 602 to 606 (non-representative images) are displayed behind the image 601 (representative image) in a stacked and shifted way to allow the user to recognize that a group including a plurality of images is displayed. Displaying images in this way partly shows the edges of the non-representative images out of the one set of images captured in the multishot mode. Thus, the user can roughly recognize what types of images are included in the group. In particular, since one set of images captured in the multishot mode include images having undergone different color processing, as described above, the user can recognize that the group includes a variety of images having undergone various color processing. A transfer button 1101 is a touch button for collectively transmitting a plurality of images (images 601 to 606) belonging to the group of the image 601 to an external apparatus via a communication unit (not illustrated) included in the digital camera 100, and for uploading the images to the Internet. When the user touches the transfer button 1101, the system control unit 50 displays a screen for specifying an external apparatus to which the group of the images 601 is to be transmitted, allowing the user to transmit images in the group of the image 601 to the specified destination in response to a user operation. A dialog 1102 displays the remaining battery capacity, and file number of the image 601 displayed as a representative image. A dialog 1103 displays the number of the image 601 (e.g., 410th) in the total number of images recorded on the recording medium 200 (e.g., 1981). With the total number of images and the number of the relevant image, a plurality of images included in one group is collectively counted as one. In other words, the total number of images indicates the number of images which can be selected by the image advancing function when a group is collectively displayed as one representative image. A FUNC button 1104 is a touch button for displaying the FUNC menu. When the user taps the FUNC button 1104, the reproduction FUNC menu for instructing processing, such as deletion, rotation, resizing, and trimming for the image 601, and a slide show is displayed. A dialog 1105 displays the attribute information of the image 601.

In step S904, the system control unit 50 determines whether the user has performed an operation for reproducing intra-group images. The user can issue instruction to reproduce images by tapping the image 601 illustrated in FIG. 11A, more specifically, by touching the image 601 and then performing a touch-up without a touch-move exceeding a predetermined distance. To avoid mis-detection with operations for other touch buttons, the system control unit 50 may receive an instruction for reproducing intra-group images only when the user touches the center portion other than edge portions out of the area where the image 601 is displayed. When it is determined that an instruction for reproducing intra-group images has been issued (YES in step S904), the processing proceeds to step S905. Otherwise (NO in step S904), the processing proceeds to step S906. The intra-group image reproduction processing in step S905 will be described below with reference to FIG. 10.

In step S906, the system control unit 50 determines whether the user has performed an image advancing operation (including an image reversing operation). When the user performs a right-flick, the system control unit 50 determines that the user has performed an image advancing operation (image reversing operation) to the preceding image. When the user performs a left-flick, the system control unit 50 determines that the user has performed an image advancing operation to the following image. When it is determined that an image advancing operation has been performed (YES in step S906), the processing proceeds to step S907. Otherwise (NO in step S906), the processing proceeds to step S908.

In step S907, in response to an operation performed in step S908, the system control unit 50 acquires the attribute information of the image to be displayed next, then in step S902, the system control unit 50 performs processing for displaying the following image. Since the system control unit 50 displays images on a group basis, the image to be displayed next is not an image of the group to which the representative image displayed in step S903 belongs but any other images than the images in the same group. For example, when the image 601 is displayed and an instruction for advancing the current image to the following image is issued, the image having the file number next to the image 606 (last image of the same group) is to be displayed.

In step S908, the system control unit 50 determines whether the user has performed an operation for shifting the mode to the multi-display. The user can issue instruction to shift the display state to the multi-display by performing a pinch-in operation on the touch panel 71 in a non-enlarged state, or an operation for rotating the shutter operation unit 61 (also serving as the zoom lever) toward the wide angle side. When it is determined that an instruction for shifting the mode to the multi-display has been issued (YES in step S908), the processing proceeds to step S924. Otherwise (NO in step S908), the processing proceeds to step S909.

In step S909, the system control unit 50 determines whether the user has performed any of other operations on the currently displayed image. Other operations include collectively deleting intra-group images and collectively transmitting intra-group images. Since the group's representative image is displayed and other images are displayed in stacked way, as illustrated in FIG. 11A, the system control unit 50 does not receive an image enlargement operation. When it is determined that any of other operations on the relevant image has been performed (YES in step S909), then in step S910, the system control unit 50 performs processing according to the relevant operation.

In step S911, the system control unit 50 determines whether an event for ending the reproduction mode has occurred, such as an operation for shifting the mode to other modes by using the mode changing switch 60, and an operation for turning the power OFF by pressing the power switch 72. When it is determined that an event for ending the reproduction mode has occurred (YES in step S911), this flowchart is terminated. When it is determined that an event for ending the reproduction mode has not occurred (NO in step S911), the processing returns to step 904. Then, the system control unit 50 repeats the relevant processing.

Meanwhile, when it is determined that the image to be displayed is not an intra-group image (NO in step S902), then in step S920, the system control unit 50 regularly (not in a stacked way) displays the image to be displayed on the display unit 28 in single display form (full-screen display).

In step S921, the system control unit 50 determines whether the user has performed an image advancing operation. The image advancing operation is similar to the operation described in step S906. When it is determined that an image advancing operation has been performed (YES in step S921), the processing proceeds to step S922. Otherwise (NO in step S921), the processing proceeds to step S923.

In step S922, according to the direction of the image advancing operation received in step S921, the system control unit 50 determines as the image to be displayed next the file having the file number preceding or following the file number of the currently displayed image. Then, the system control unit 50 acquires the attribute information of the image to be displayed next from the relevant image file, and returns to step S902 to perform the processing for displaying the image to be displayed next.

In step S923, the system control unit 50 determines whether the user has performed an operation for shifting the mode to the multi-display. The operation for shifting the mode to the multi-display is similar to the operation described in step S908. When it is determined that an instruction for shifting the mode to the multi-display has been issued (YES in step S923), the processing proceeds to step S924. Otherwise (NO in step S923), the processing proceeds to step S927.

In step S924, the system control unit 50 displays a plurality of images on the display unit 28 in multi-display form. FIG. 11B illustrates an example of nine images displayed in 3×3 multi-display form. Like the image 601, images belonging to a group are collectively displayed in a stacked way with the representative image placed on top, and therefore the entire faces of the remaining intra-group images other than the representative image are not displayed. Further, images are displayed in top-justified form. Thus, FIG. 11B illustrates a case where nine or more images are recorded on the recording medium 200. When there are only six images, for example, the layout of the first and second rows is as illustrated in FIG. 11B, and no image is displayed in the third row (bottom row).

In step S925, the system control unit 50 receives various operations in the multi-display, and performs processing according to the received operations. Receivable operations include an operation for deleting or transmitting a selected image, a scroll operation for selecting the preceding or following image as the image to be displayed on the same screen, and an operation for increasing the number of images to be displayed at a time in multi-display form.

In step S926, the system control unit 50 determines whether the user has performed an operation for shifting the mode to the single display. The user can issue instruction to shift the mode to the single display by performing a pinch-out operation on the touch panel 71, an operation for rotating the shutter operation unit 61 toward the telephoto side, or an operation for selecting any one of the displayed images. When it is determined that an instruction for shifting the mode to the single display has been issued (YES in step S926), then in step S901, the system control unit 50 selects single display form. Otherwise (NO in step S926), the processing returns to step S925. Then, the system control unit 50 repeats the relevant processing.

In step S927, the system control unit 50 determines whether the user has performed any of other operations on the currently displayed images. Other operations include deleting, transmitting, resizing, and trimming a displayed image, giving a favorite attribute, and enlargement and reduction. When it is determined that any of other operations has not been performed (NO in step S927), the processing proceeds to step S929. On the other hand, when it is determined that any of other operations has been performed (YES in step S927), then in step S928, the system control unit 50 performs processing according to the relevant operation.

In step S929, the system control unit 50 determines whether an event for ending the reproduction mode has occurred, such as on operation for shifting the mode to any of other modes by using the mode changing switch 60, and an operation for turning the power OFF by pressing the power switch 72. When it is determined that an event for ending the reproduction mode has not occurred (NO in step S929), the processing returns to step S921. Then, the system control unit 50 repeats the relevant processing. On the other hand, when it is determined that an event for ending the reproduction mode has occurred (YES in step S929), the system control unit 50 ends the reproduction mode processing.

FIG. 10 is a detailed flowchart illustrating the intra-group image reproduction processing in step S905 illustrated in FIG. 9. This processing is implemented when the system control unit 50 loads a relevant program recorded on the nonvolatile memory 56 into the system memory 52 and then executes it.

In step S1001, the system control unit 50 displays a list of images in a group on the display unit 28.

Figure 11C:
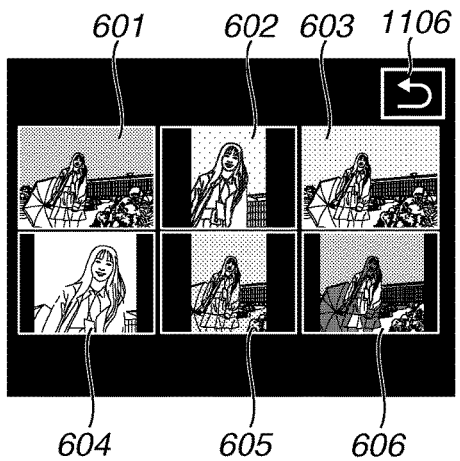
Figure 11B:
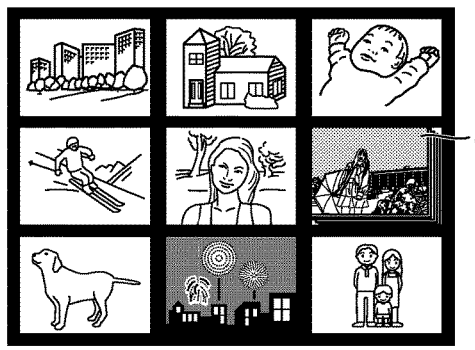

FIG. 11C illustrates an example of a list of intra-group images displayed on the display unit 28. The images 601 to 606 belonging to the same group as the image 601, the group's representative image displayed in step S903, are displayed on the display unit 28 in a 2×3 matrix form. Other images not belonging to the group are not displayed. Referring to FIG. 11C illustrating image display in the reproduction mode, the images 601 to 606 are displayed not in areas having different sizes as with the recording review illustrated in FIG. 8A but in arranged areas having the same size. Therefore, the images can be compared under the same condition. Further, unlike the regular multi-display in top-justified form (FIG. 11B), a plurality of images included in the same group is displayed in centered form, as illustrated in FIG. 11C. This example indicates that there is no more images preceding (above) or following (below) the six images currently displayed. Therefore, the user can recognize that a total of six images are included in the group. Although, in the example illustrated in FIG. 11C, each image is displayed in an area having an aspect ratio of 4:3, each image may be displayed in an area having an aspect ratio of 1:1. When the user touches the return button 1106 (touch button), the system control unit 50 ends the list of intra-group images, and displays the representative image illustrated in FIG. 11A. Thus, in response to an intra-group image reproduction instruction in a state where the group's representative image is displayed in single display form (step S903, FIG. 11A), the system control unit 50 first displays a list of intra-group images in multi-display form, instead of immediately displaying intra-group images in single display form. Thus, the user can recognize that the digital camera 100 has entered a mode in which each of a plurality of images belonging to a group is displayed.

In step S1002, the system control unit 50 determines whether the user has performed an operation for shifting the mode to the single display. The user can issue instruction to shift the mode to the single display by performing an operation for selecting any one image from the list, an operation for rotating the shutter operation unit 61 to the telephoto side, or a pinch-out operation on the touch panel 71. When it is determined that an instruction for shifting the mode to the single display has been issued (YES in step S1002), the processing proceeds to step S1004. Otherwise (NO in step S1002), the processing proceeds to step S1003.

In step S1003, the system control unit 50 determines whether the user has performed a tap operation on the return button 1106 (i.e., an operation in which the touch panel 71 is touched, and then a touch-up is detected on the button 1106 without detecting a touch-move exceeding a predetermined distance). When it is determined that a tap operation on the return button 1106 has been performed (YES in step S1003), the system control unit 50 ends the intra-group image reproduction processing. Then, in step S903 illustrated in FIG. 9, the system control unit 50 displays the group's representative image, as illustrated in FIG. 11A. When it is determined that a tap operation on the return button 1106 has not been performed (NO in step S1003), the processing returns to step S1002.

In step S1004, an image included in the group is displayed full-screen (i.e., the entire image is displayed in the maximum size of the display area).

Figure 11D:
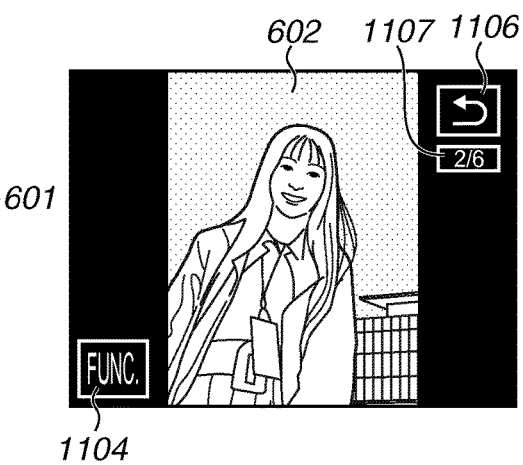

FIG. 11D illustrates an example of an intra-group image displayed in single display form. For example, referring to the list screen illustrated in FIG. 11C, when the user selects the image 602, the image 602 is displayed full-screen on the display unit 28, as illustrated in FIG. 11D. A dialog 1107 displays the total number of images (e.g., 6) belonging to the group, and the number of the currently displayed image 602 (e.g., 2nd).

In step S1005, the system control unit 50 determines whether the user has performed an operation on the image displayed in single display form. When it is determined that an operation on the image has been performed (YES in step S1005), the processing proceeds to step S1006. Otherwise (NO in step S1005), the processing proceeds to step S1007. Operations on an image displayed in single display form include an operation for deleting the image displayed in single display form, an operation for enlarging the image (a pinch-out operation or an operation for rotating the shutter operation unit 61 toward the telephoto side), an operation for transmitting the image to an external apparatus, an operation for recording the favorite attribute, a resizing operation, and a trimming operation.

In step S1007, the system control unit 50 determines whether the user has performed an image advancing operation (or image reversing operation). When it is determined that an image advancing operation has been performed (YES in step S1007), the processing proceeds to step S1008. Otherwise (NO in step S1007), the processing proceeds to step S1009. The image advancing operation is similar to the operation described in step S906 in FIG. 9.

In step S1008, the system control unit 50 changes the image to the preceding or following intra-group image according to the image advancing operation performed in step S1007. In this case, images not belonging to the group are not subjected to the image advancing operations. Therefore, for example, when an instruction for advancing the displayed image to the following image is issued in a state where the image 606 is displayed, the image 601 is displayed. When an instruction for advancing the displayed image to the preceding image issued in a state where the image 601 is displayed, the image 606 is displayed.

In step S1009, the system control unit 50 determines whether the user has performed a tap operation on the return button 1106. When it is determined that a tap operation has been performed on the return button 1106 (YES in step S1009), the system control unit 50 ends the intra-group image reproduction processing. Then, in step S903 illustrated in FIG. 9, the system control unit 50 displays the group's representative image, as illustrated in FIG. 11A. When it is determined that a tap operation has not been performed (NO in step S1009), the processing returns to step S1005.

Figure 11E:
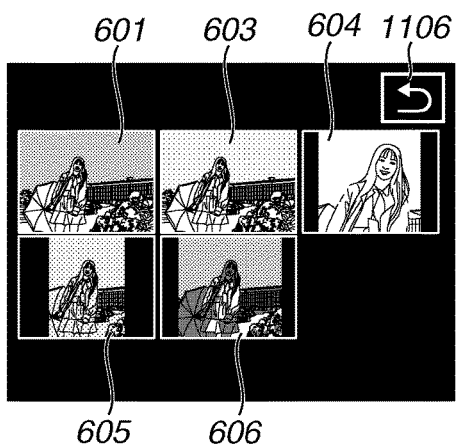

When an image belonging to the group is deleted in the above-described image operation processing in step S1006 and then the system control unit 50 shifts the processing to the intra-group image reproduction processing, the remaining images are displayed covering the position of the deleted image (the image 602 is deleted in the example in FIG. 11E), as illustrated in FIG. 11E. Thus, the deleted image is not simply hidden, as described in FIG. 8B.

According to the above-described intra-group image reproduction processing, when changing from the single display of the representative image to the state for displaying each intra-group element image, the system control unit 50 first displays a list of images in the group, as illustrated in FIG. 11C, instead of directly displaying an element image in single display form. Thus, the user can certainly recognize that the digital camera 100 has entered a state where only element images in the group are displayed, thus preventing confusion with the state where images are displayed regardless of the group.

The digital camera 100 can perform shooting in the exposure-bracket mode which is different from the multishot mode. The user can change the mode to the exposure-bracket mode by operating the mode changing switch 60. In the exposure-bracket mode, when SW2 is turned ON, the system control unit 50 performs shooting to capture at least one image on the underexposure side, shooting with suitable exposure, and shooting to capture at least one image on the overexposure side. As a result, in response to one full-press operation on the shutter operation unit 61, the system control unit 50 performs shooting to capture three or five images. Since the purpose of this operation is to capture a plurality of images with different exposure settings, shooting settings other than exposure, such as color processing, remain unchanged. Unlike the multishot mode, the recording review in the exposure-bracket mode displays captured images in the same size on the same screen. Further, the system control unit 50 arranges an image captured on the underexposure side, an image captured with suitable exposure, and an image captured on the overexposure side from left to right on the screen. Arranging images in this way makes it easier to compare differences in brightness between images arising from differences in exposure therebetween, and to determine which image has been captured with brightness felt to be most suitable by the user. The layout in the recording review display is differentiated from that in the multishot mode in this way based on the difference in the assumed purpose of use between shooting modes. In other words, the bracket shooting mode is a mode for capturing an image with suitable exposure, and is not a mode for pursuing the interest by capturing a variety of images having different atmospheres as in the multishot mode.

Control by the system control unit 50 may be implemented by one hardware component, or implemented in such a way that a plurality of hardware components shares processing to control the entire apparatus.

While the present disclosure has specifically been described based on exemplary embodiment(s), the embodiment(s) are not seen to be limiting, and can be modified in diverse ways without departing from the spirit and scope thereof. Further, the above-described exemplary embodiments are to be considered as illustrative and not restrictive of the scope of the present disclosure. These exemplary embodiments can be suitably combined.

While the above-described exemplary embodiments have been described based on a case of application to the digital camera 100, this application is not limiting, and the embodiments are also applicable to imaging apparatuses capable of generating a plurality of images in response to a single shooting instruction. More specifically, the embodiments are applicable to camera-equipped personal computers and personal digital assistants (PDAs), camera-equipped cellular phone units and portable image viewers, camera-equipped game machines, and camera-equipped electronic book readers.

Additional embodiments can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-284430 filed Dec. 27, 2012, which is hereby incorporated by reference herein in its entirety.

What is claimed is:

1. An imaging apparatus comprising:
an imaging unit;
a memory configured to store an imaging program; and
a system control unit communicatively-coupled to the memory configured to execute the imaging program to:
perform control to cause the imaging unit to shoot a plurality of images in response to a single shooting instruction;
perform control to generate a set of images from the plurality of images and record each image in the generated set of images as individual image files in response to the same single shooting instruction; and
perform control to automatically perform review display of the generated set of images in response to the same single shooting instruction,
wherein the automatically performed review display includes
(a) sequentially displaying each image of the generated set of images in a single image display form on a display unit, wherein in the single image display form each image of the generated set of images is switched from one to another, and then,
(b) displaying the generated set of images in a multi-image display form, wherein in the multi-image display form each image of the generated set of images are displayed on a same screen of the display unit without displaying any live view image and any image shot in response to any shooting instruction other than the single shooting instruction,
wherein each image of the generated set of images displayed in the single image display form is displayed in a larger size on the display unit than each image of the generated set of images displayed in the multi-image display form.

2. The imaging apparatus according to claim 1, wherein, in the multi-image display form, the system control unit performs control to enlarge or reduce each image in the generated set of images so that each image fits into any one of a plurality of areas having sizes including different sizes to display the generated set of images on the same screen.

3. The imaging apparatus according to claim 2, further comprising:
the system control unit performing control to set the imaging apparatus to any one of a plurality of operation modes including at least a shooting mode and a reproduction mode,
wherein, in the reproduction mode, the system control unit performs control to enlarge or reduce each image in the generated set of images so that each image fits into any one of a plurality of areas having the same size to display the generated set of images on the same screen.

4. The imaging apparatus according to claim 1, wherein, in the multi-display form, the system control unit performs control to enlarge or reduce each image in the generated set of images so that each image fits into any one of a plurality of areas not arranged in matrix form to display the generated set of images on the same screen.

5. The imaging apparatus according to claim 4, further comprising:
the system control unit performs control to set the imaging apparatus to any one of a plurality of operation modes including at least a shooting mode and a reproduction mode,
wherein, in the reproduction mode, the system control unit performs control to enlarge or reduce each image in the generated set of images so that each image fits into any one of a plurality of areas arranged in matrix form to display the generated set of images in the multi-display form on the same screen.

6. The imaging apparatus according to claim 1, wherein the system control unit performs control to end the multi-image display form when a predetermined time duration has elapsed.

7. The imaging apparatus according to claim 6, wherein the predetermined time duration is the time duration measured since the image display is started.

8. The imaging apparatus according to claim 6, wherein, when a predetermined user operation is performed during displaying in the multi-image display form, the control performed does not end the display in the multi-display form even when the predetermined time duration has elapsed.

9. The imaging apparatus according to claim 1, wherein the system control unit performs control to enlarge a user-selected image out of the generated set of images displayed in the multi-image display form to a larger size than the size in the multi-image display form, and to display the user-selected image on the display unit, and
wherein, when the user-selected image is displayed, control is performed to accept user operations for instructing processing on the displayed user-selected image.

10. The imaging apparatus according to claim 9, wherein, in a state where the user-selected image is displayed on the display unit, in response to a user operation, the system control unit performs control to change the currently displayed image to any image of the generated set of images without changing the currently displayed image to any image other than one included in the generated set of images.

11. The imaging apparatus according to claim 1, wherein, in the multi-display form, after any one of the generated set of images displayed in the multi-image display form has been deleted, control is performed that does not change the display position and size of any other images other than the deleted image from those before the deletion.

12. The imaging apparatus according to claim 1, wherein, in response to the single shooting instruction, the system control unit performs control to capture a plurality of images with at least one shooting method out of a plurality of shooting methods including exposure-bracket shooting and focus-bracket shooting based on analysis of the captured plurality of images.

13. The imaging apparatus according to claim 1, wherein, the system control unit performs control to apply different image processing to the images captured in response to the single shooting instruction to generate the set of images.

14. The imaging apparatus according to claim 13, wherein the image processing includes at least color processing or trimming processing.

15. The imaging apparatus according to claim 1, further comprising:
the system control unit performs control to change the imaging apparatus to any one of a plurality of shooting modes including a specific shooting mode to perform shooting to generate the set of images in response to a single shooting instruction,
wherein, in the specific shooting mode, control is performed to display a remaining number of issuable shooting instructions together with a through image based on a remaining capacity of a recording medium for recording images.

16. The imaging apparatus according to claim 1,
wherein, in response to an image advancing operation in a reproduction mode, control is performed to advance images of any one group including a group composed of the generated set of images, by using a representative image,
wherein, in a state where the representative image is displayed, when an instruction for displaying each image belonging to the group is issued, control is performed to change the display of the representative image to another image of the generated set of images belonging to the group on the same screen.

17. The imaging apparatus according to claim 1, wherein, when the display control unit sequentially displays the generated set of images in such a way as to switch the generated set of images from one to another in a single display form, the display control unit displays each of the generated set of images in full-screen on the display.

18. The imaging apparatus according to claim 17, wherein, when display control unit displays each of the generated set of images in full-screen on the display unit, the entire image is displayed in maximum size of the display area.

19. A method for controlling an imaging apparatus, the method comprising:
performing control to cause an imaging unit to shoot a plurality of images in response to a single shooting instruction;
performing control to generate a set of images from the plurality of images and record each image in the generated set of images as individual image files in response to the same single shooting instruction; and
performing control to automatically perform review display of the generated set of images in response to the same single shooting instruction,
wherein the automatically performed review display includes
(a) sequentially displaying each image of the generated set of images in a single image display form on a display unit, wherein in the single image display form each image of the generated set of images is switched from one to another, and then, (b) displaying the generated set of images in a multi-image display form, wherein in the multi-image display form each image of the generated set of images are displayed on a same screen of the display unit without displaying any live view image and any image shot in response to any shooting instruction other than the single shooting instruction, wherein each image of the generated set of images displayed in the single image display form is displayed in a larger size on the display unit than each image of the generated set of images displayed in the multi-image display form.

20. A non-transitory computer-readable storage medium storing a program for causing a computer to execute the control method according to claim 19.

21. An imaging apparatus comprising:
an imaging unit;
a memory configured to store an imaging program; and
a system control unit communicatively-coupled to the memory configured to execute the imaging program to:
perform control to set the imaging apparatus to any one of a plurality of operation modes including at least a shooting mode and a reproduction mode;
perform, in the shooting mode, control to perform shooting to generate a set of a plurality of images in response to a single shooting instruction;
perform control to evaluate each image of the generated set of the plurality of images,
wherein during the evaluation each image of the generated set of the plurality of images is evaluated using an evaluation criteria including at least one of a configuration of a subject and a contrast of the subject;
perform control to automatically perform review display after shooting in response to the shooting instruction,
perform control to enlarge or reduce each image of the generated set of the plurality of images so that each image fits into any one of a plurality of areas having sizes including different sizes to display the images of the generated set of the plurality of images on a same screen, and, in the reproduction mode,
perform control to arrange each image of the generated set of the plurality of images so that each image fits into any one of a plurality of areas having the same size to display the images in a multi-display form on the same screen, and
wherein the perform control to enlarge or reduce the each image of the generated set of the plurality of images further includes performing control to display, in the review display, the generated set of the plurality of images in a layout based on an evaluation made, and
wherein the reproduction mode further includes performing control to display the generated set of the plurality of images in a layout regardless of an evaluation made.

22. The imaging apparatus according to claim 21,
wherein, in the automatically performed review display, control is performed to enlarge or reduce each image of the generated set of the plurality of images so that each image fits into any one of a plurality of areas not arranged in matrix form to display the images on the same screen, and
wherein, in the reproduction mode, control is performed to arrange each image of the generated set of the plurality of images so that each image fits into any one of a plurality of areas arranged in matrix form to display the generated set of the plurality of images in the multi-display form on the same screen.

23. The imaging apparatus according to claim 21, wherein, in the review display, after shooting in response to the shooting instruction, in an automatic way, control is performed to sequentially display the generated set of the plurality of images one by one on a display unit, and then display the generated set of the plurality of images in the multi-display form on the same screen.

24. An imaging apparatus comprising:
an imaging unit;
a memory configured to store an imaging program; and
a system control unit communicatively-coupled to the memory configured to execute the imaging program to:
perform control to set the imaging apparatus to any one of a plurality of operation modes including at least a shooting mode and a reproduction mode;
perform control, in the shooting mode, to generate a set of a plurality of images in response to a single shooting instruction;
perform control to evaluate each image of the generated set of the plurality of images,
wherein during the evaluation each image of the generated set of the plurality of images is evaluated using an evaluation criteria including at least one of a configuration of a subject and a contrast of the subject; and
perform control, to automatically perform review display after shooting in response to the shooting instruction,
perform control to enlarge or reduce each image of the generated set of the plurality of images so that each image fits into any one of a plurality of areas not arranged in matrix form to display the images of the generated set of the plurality of images in a multi-display form on a same screen, and
perform control in the reproduction mode to arrange each image of the generated set of the plurality of images so that each image fits into any one of a plurality of areas arranged in matrix form to display the images in the multi-display form on the same screen, and
wherein the perform control to enlarge or reduce the each image of the generated set of the plurality of images further includes performing control to display, in the review display, the set of the plurality of images in a layout based on an evaluation made, and
wherein the reproduction mode further includes performing control to display, the generated set of the plurality of images in a layout regardless of an evaluation made.

25. A method for controlling an imaging apparatus, the method comprising:
performing shooting;
performing control to generate a set of images from at least one image captured in response to a single shooting instruction, wherein the set of images is composed of plural images that are generated from at least one image captured in response to the same single shooting instruction and are recorded as individual image files separately; and
performing control to
(a) sequentially display each image of the generated set of images in such a way as to switch each image of the generated set of images from one to another in a single display form on a display unit as automatically performed review display after shooting in response to the shooting instruction, and then,
(b) display the generated set of images in a multi-display form on a same screen without displaying any image shot in response to any shooting instruction other than the single shooting instruction and without displaying any live view image, wherein each image of the generated set of images is displayed in a larger size in the automatically performed review display in (a) than the multi-display form in (b).

26. A non-transitory computer-readable storage medium storing a program for causing a computer to execute the control method according to claim 25.

* * * * *